United States Patent [19]
Duffey et al.

[11] 3,826,232
[45] July 30, 1974

[54] COMPOSITION AND METHOD FOR THE CONTROL OF FLEAS ON DOMESTICATED ANIMALS

[75] Inventors: Thomas E. Duffey; William R. Coleman, both of Miami, Fla.

[73] Assignee: Pet Chemicals, Incorporate, Miami Springs, Fla.

[22] Filed: May 21, 1971

[21] Appl. No.: 145,706

Related U.S. Application Data

[63] Continuation-in-part of Ser. No. 73,684, Sept. 18, 1970, which is a continuation-in-part of Ser. No. 28,110, April 13, 1970, abandoned.

[52] U.S. Cl............... 119/157, 43/124, 43/131, 128/260, 132/88.7, 401/68, 401/75, 424/10, 424/14, 424/18, 206/56
[51] Int. Cl.. A01k 29/00, B43k 21/08, A01n 17/00
[58] Field of Search............ 43/124, 131; 119/157; 424/24, 28, 10, 18; 128/260; 132/88.7; 401/68, 75; 206/56

[56] References Cited
UNITED STATES PATENTS

| | | | |
|---|---|---|---|
| 2,149,005 | 2/1939 | Bockmuhl | 424/358 |
| 2,465,470 | 3/1949 | Omohundro et al. | 424/358 X |
| 2,818,167 | 12/1957 | McKinley | 401/75 |
| 2,819,995 | 1/1958 | Wassell | 424/358 |
| 2,987,484 | 6/1961 | Lundberg et al. | 252/174 |
| 3,080,327 | 3/1963 | Hay | 252/366 |
| 3,111,539 | 11/1963 | Bocker et al. | 424/300 X |
| 3,122,481 | 2/1964 | Wotzilka et al. | 424/64 |
| 3,162,575 | 12/1964 | Lang | 424/219 |
| 3,234,091 | 2/1966 | Lang et al. | 424/358 |
| 3,343,540 | 9/1967 | Siegel | 128/269 |
| 3,404,208 | 10/1968 | Robertson et al. | 424/300 |

*Primary Examiner*—Shep K. Rose
*Attorney, Agent, or Firm*—James F. Jones

[57] ABSTRACT

A pest control composition in a solid stick form is provided for topical application around the neck or on the face of domesticated animals such as dogs, cats, cattle, horses and the like to control fleas, lice, ticks, flies, and like pests. Topical application about the neck or face of the animal in an amount ranging from about 0.1 to 0.3 grams, preferably about 0.13 to 0.25 grams, per kilogram of body weight results in the elimination of all fleas at the end of twenty to twenty four hours, a single application being effective for one to two weeks in most cases without evidence of irritation to the animal. The stick composition of the present invention comprises 0-(2-isopropoxyphenyl)-N-methylcarbamate as the active ingredient uniformly dispersed in a compatible solid base material and in a stable state. The present invention provides a pesticidal package for applying the composition to the neck or face of the animal.

6 Claims, 1 Drawing Figure

PATENTED JUL 30 1974 3,826,232
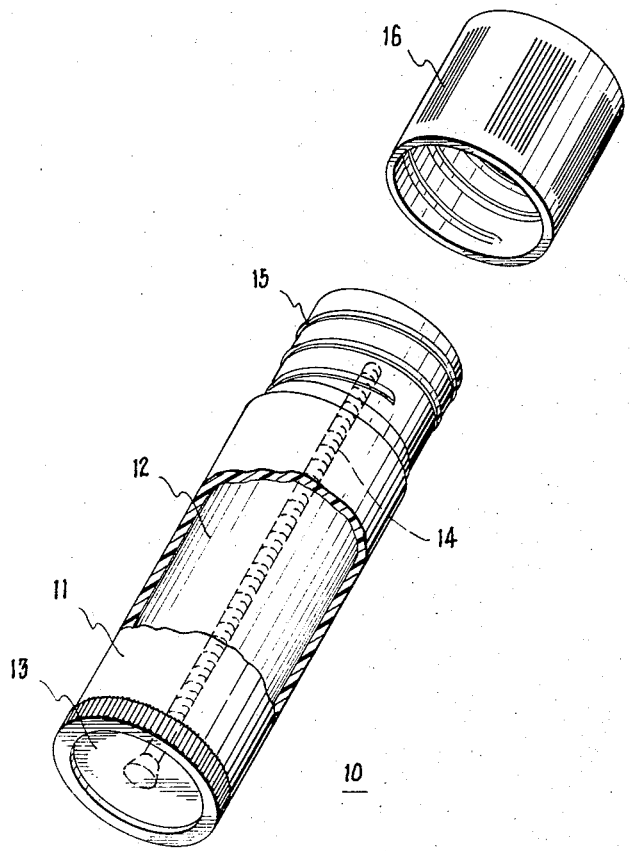
INVENTORS
Thomas E. Duffey
William R. Coleman

COMPOSITION AND METHOD FOR THE CONTROL OF FLEAS ON DOMESTICATED ANIMALS

RELATED APPLICATIONS

This application is a continuation-in-part of copending application Ser. No. 73,684, filed Sept. 18, 1970, which, in turn, is a continuation-in-part of copending application Ser. No. 28,110, filed Apr. 13, 1970 both applications now abandoned.

BACKGROUND OF THE INVENTION

The control and elimination of pests, such as fleas, lice and the like, on domesticated animals, and particularly household pets such as dogs and cats, has long been a matter of great concern. This concern encompasses man's altruistic interest in the comfort and well-being of his pets, but also extends to a desire to maintain a household and person free of infestation from such pests. Such interest also extends to the comfort of other domesticated animals, such as cattle and horses, which are bothered not only by ticks, lice and the like, but also face flies.

In attempts to rid domesticated animals of such pest infestations, a number of compositions and techniques of application have been proposed heretofore. For example, pesticidal amounts of flea-killing compounds and compositions have been supplied in sprays and dusting powders, for periodic application to the animal. In addition, pesticidal soaps and shampoos have also been utilized. Such compositions have generally proved to be limited in their effectiveness and combersome and inconvenient to use. In other cases, toxic or irritating effects upon domesticated animals have occurred. Such compositions also pose a threat to human infants and young children.

It has also been attempted to provide pesticidal agents in a so-called flea collar. In the most usual case, the flea collar is a leather or plastic strap, coated or impregnated with relatively large amounts of pesticidal agents, which is adapted to be worn by the domesticated animal about the neck in the manner of an ordinary collar. Flea collars of this type have been generally effective from a functional standpoint in eliminating and controlling the incidence of fleas. However, such collars have proved to be irritating to some dogs and cats, and particularly puppies up to eight weeks. Moreover, such collars have not been effective against all pests and capable of use with all animals.

Thus, the compositions and techniques heretofore employed have not been entirely satisfactory in practice.

SUMMARY OF THE INVENTION

It is an object of the present invention to provide a method for the elimination and control of all forms of pests on domesticated animals.

A further object is the provision of a composition for the elimination and control of pests which may be conveniently and readily applied to the neck or face of the animal.

A still further object of the invention is the provision of such a composition which will be found to be non-toxic or irritating to the animal to which it is applied.

Another object of the present invention is to provide a pest control composition in which the active ingredient will be maintained in a stable active state for a prolonged period of time.

Yet another object of the present invention is the provision of a pest controlling package for the topical application of the composition to the neck or face of the animal.

These and still other objects, which will become apparent from the following disclosure, are realized by the composition and method of the present invention.

It has now been found in accordance with the present invention that a pest controlling formulation comprising a pesticidal amount on the order of about 0.25 or 2.0 percent by weight of 0(2-isopropoxyphenyl)-N-methyl-carbamate in an inert solid stick carrier formulation having a pH on the acid side, to wit, a pH of less than about 7, preferably about 3.5 to not higher than about 7.0, and most preferably about 4.5 to 5.5, can be topically applied about the neck of a domesticated animal to attain a substantially complete kill of the pests within 20 to 24 hours and prevent re-infestation in the animal for 1 to 2 weeks. The appropriate dosage for application is about 0.1 to 0.3, preferably about 0.13 to 0.25, grams per kilogram of animal weight.

The active ingredient of the pest composition of the present invention is, as hereinbefore indicated, 0(2-isopropoxyphenyl)-N-methyl-carbamate and is disclosed in U.S. Pat. No. 3,111,539, issued Nov. 19, 1963, to Böcker et al, which fully discloses the preparation thereof.

The active ingredient is combined in a stick formulation having the proper hardness for rubbing off a uniform amount of material onto the neck of the animal. Such formulations are well-known in the art together with appropriate techniques for their preparation.

The composition prepared in accordance with the present invention has not been found physically irritating to dogs or other domesticated animals, even when the recommended dosage is substantially exceeded and/or when repeated numerous aplications of the composition are made. A single topical application of the recommended dosage is effective to prevent re-infestation of the dog or other animal for a period of 1 to 2 weeks.

The composition of the present invention provides the effective elimination and control of pests in general and fleas in particular on dogs, cats, and other domesticated animals in a fashion which is odorless and invisible, convenient to apply and non-irritating to the animal.

BRIEF DESCRIPTION OF THE DRAWING

FIG. 1 of the drawing is a perspective view of a pest controlling package made in accordance with the present invention.

DESCRIPTION OF SPECIFIC AND ILLUSTRATIVE EMBODIMENTS

In the formulation of compositions and packages made in accordance with the present invention, certain factors must be carefully considered in preparing the compositions by reason of the properties of the active ingredient employed therein. As a general rule, stick formulations are normally prepared such that the composition is on the alkaline side. However, the carbamate employed in the present invention tends to be unstable in an alkaline medium. As a result thereof, the ingredients employed in preparing the pest control compositions of the present invention must be selected so that the finished stick formulation will be on the acid side.

It has also been found that in the use of the aforementioned carbamate, care must be exercised in the selection of the bodying and dispersing agents within which the active ingredient is to be dispersed or dissolved. For example, in employing petroleum derivatives, waxes and similar materials, which are well-known as satisfactory compounds in producing stick-like products, as bodying or dispersing agents in the present invention, a problem of continual dispersion exists. It has been found that when the carbamate is employed as the active ingredient in the present invention, it is readily dispersible when the petroleum derivatives, waxes and the like are maintained in a hot state. However, it has been found that when such materials are then poured and permitted to solidify, the carbamate separates from the bodying agent and forms on the surface thereof.

The bodying or carrying agent for the carbamate of the present invention, in order to provide a commercially acceptable product, must retain the carbamate in solution or uniform dispersion throughout the body in a hot state and also in a solidified cold state. A particular class of materials that has been found to be of particular utility as a bodying agent in the practice of the present invention, and which will retain the aforementioned carbamate in a uniformly dispersed state at all times, is the class of compounds marketed under the generic trade name of "Carbowax." This trademark identifies a class of polyethylene glycol and derivatives thereof.

The pest control stick formulation of the present invention is to be marketed in packaged form. In general, the package will be made from a plastic material and under such circumstances care must be exercised in selecting the particular plastic to be employed. It has been found that the plastic utilized must be one that is compatible with the ingredients used. For example, it has been found that plastic packages made from styrene tend to react with certain ingredients of the compositions and therefore this material is not generally acceptable. On the other hand, plastic packages made from acrylonitrile and like plastics have been found to be compatible with the pest control compositions made in accordance with the present invention and can be used therewith without fear of reaction therebetween.

In general, the formulation made in accordance with the present invention may be prepared from a wide variety of materials well known to the art and which will be compatible with the active ingredient in the manner hereinbefore noted. In general, the composition of the present invention may be made up of the following general formula, the percents given being by weight percent:

| | |
|---|---|
| Solid stick formulation | 98.0–99.5% |
| Fatty acid | 10–20% |
| Fatty alcohol | 5–15% |
| Polyalkylene glycol | 55–85% |
| Bitter tasting agent | 0.0–0.1% |
| O-(2-isopropoxyphenyl)-N-methyl carbamate | 0.25–2.0% |
| The pH of the composition is to be from | 3.5 to 7.0 |

In the above formula with respect to the ingredients employed in the solid stick formulation, the fatty acid that may be employed includes palmitic, stearic, oleic, linoleic and linolenic, with triple pressed stearic acid being preferred. The fatty alcohol that may be employed includes octyl, decyl, lauryl, myristy, cetyl, stearyl, oleyl, linoleyl and linolenyl, with cetyl alcohol being preferred.

The polyalkylene glycol is intended to denote polymers of alkylene glycol, with the particular and preferred class being polyethylene glycols by reason of their ready availability. The polyethylene glycols will be found to have a molecular weight ranging from 200 to 6,000, with the properties varying with the molecular weight. These materials are generally designated as, for example, polyethylene glycol 300, polyethylene glycol 1,000, polyethylene glycol 1,540, polyethylene glycol 4,000, and polyethylene glycol 6,000. Such compounds are marketed under the generic trademark "Carbowax" by Union Carbide Corporation, New York, N.Y. In the selection of such materials, a mixture of two different polyethylene glycols having different molecular weight can be employed.

The bitter tasting ingredient noted above may be any material which, when added to the composition, will impart a bitter taste thereto. The advantage of this compound is that it will tend to prevent any licking off of the composition by another animal and will also be a deterrent to tasting by children. Such compounds are readily available on the market, such as, for example, benzyldiethyl(2:6-xylylcarbamoyl) ammonium benzoate, which may be identified as denatonium benzoate. While none are listed in the above stick formulation, other conventional ingredients, such as deodorants, perfumes, coloring agents and the like, may be incorporated therewith.

In the following illustrative examples, a carrier composition is utilized which is particularly preferred because of the exceptionally low levels of toxicity and the high degree of physical and chemical compatability and stability of the resultant formulation.

EXAMPLE 1

A first mixture is formed by combining 16 parts by weight triple pressed stearic acid, 11 parts by weight of a polyethylene glycol having a molecular weight of about 6,000 (Carbowax 6,000), 55 parts by weight of a polyethylene glycol having a molecular weight of about 44 (Carbowax 400), and 5 parts by weight of cetyl alcohol. The mixture is heated with agitation until a clear solution results. A temperature of about 50°C is ordinarily sufficient.

A second mixture is formed of 1 part by weight ortho-o-(2-isopropoxyphenyl)-N-methyl carbamate and 10 parts by weight of a polyethylene glycol having a molecular weight of about 400 (Carbowax 400). The mixture is heated with agitation until a clear solution results. A temperature of about 50°C is ordinarily sufficient.

A third mixture is formed, comprising 2 parts by weight of a solution of benzyldiethyl (2,6-xylylcarbamoyl methyl) ammonium benzoate, an extremely bitter taste ingredient, in Carbowax 400 in the weight ratio of 1:400.

The foregoing three component mixtures are combined at elevated temperature, e.g., about 50°C, thoroughly mixed and poured into appropriate molds or containers.

The resultant molded composition has a clear, smooth and homogeneous appearance and a smooth feel to the touch. It remains solid at temperatures up to about 120°F.

EXAMPLE 2

The composition of Example 1 was evaluated by the following test procedure:

A number of test dogs were placed in separate, individual cages, using as many breeds, sizes, ages, and hair lengths as possible. A check of the level of flea infestation was made, and then either the formulation of Example 1 or a control formulation, identical in composition to that of Example 1, but omitting the active ingredient, was applied to each animal. The formulations were employed in the form of cylindrical sticks about one inch in diameter. With about one-fourth inch of each stick exposed, the stick was rubbed twice around the neck of each test animal, pressing firmly. One additional application was made on the belly, by pressing the stick against the chest and rubbing back across the anterior body.

The stick was weighed before and after each application to determine the weight of material used on each dog. At 2 hours, 24 hours, and 7 days after application, the number of dead fleas in each cage and the level of infestation of each dog is noted. At the same times, each animal is checked for signs of dermatosis and other side effects.

Ten control dogs and 20 test dogs were so treated. The results are reported in Table 1 for the control animals and Table 2 for the test animals using the formulation of Example 1.

As hereinbefore indicated, it is within the spirit and scope of the present invention to provide a pest control package wherein the pest control composition is applied to the neck or face of the animal to be treated. An illustrative embodiment of a pest control package made in accordance with the present invention is shown in the drawing. It is to be clearly understood that the embodiment shown in the drawing is illustrative in character only and there are other forms of pest control pack- Table 1

| Run | Breed[a] | Wt. Kg. | Sex | Hair[b] Length | Flea Infestation[c] Time | | | | No. of Dead Fleas Time | |
|---|---|---|---|---|---|---|---|---|---|---|
| | | | | | 0 Hr | 2 Hr | 24 Hr | 7 day | 2 hr | 24 hr |
| 1 | M | 14.1 | M | M | H | M-H | M-H | L | 7 | 15 |
| 2 | M | 10.7 | F | M | M-H | M-H | L-M | L | 4 | 11 |
| 3 | M | 10.2 | F | L | H | H | H | M-H | 5 | 41 |
| 4 | M | 11.8 | M | M | H | H | M-H | M-H | 0 | 19 |
| 5 | B[d] | 2.7 | F | S | M-H | M-H | M-H | M-H | 0 | 3 |
| 6 | S[d] | 5.7 | F | L | M | L-M | L | L | 0 | 4 |
| 7 | B | 5.9 | F | S | M-H | M-H | L-M | L | 2 | 4 |
| 8 | B | 13.6 | M | S | H | H | M-H | L-M | 8 | 18 |
| 9 | T | 10.2 | M | S | H | M-H | M-H | M-H | 0 | 6 |
| 10 | C | 11.8 | F | L | M | L-M | L-M | L-M | 0 | 2 | a. M = Mixed Breed, T = Terrier, B = Beagle, C = Collie, S = Spaniel
b. S = Short, M = Medium, L = Long
c. L = Less than 10, M = 10 to 20, H = more than 21
d. A designation given to pups, 3-6 weeks old.

Table 2

| Run | Breed[a] | Wt. Kg. | Sex | Hair[b] Length | Sample Applied gm | Flea Infestation[c] Time | | | | No. of Dead Fleas Time | |
|---|---|---|---|---|---|---|---|---|---|---|---|
| | | | | | | 0Hr. | 2Hr. | 24Hr. | 7days | 2hr. | 24hr. |
| 11 | M | 10.2 | F | M | 1.7 | H | H | 0[d] | 0[d] | 127 | 49 |
| 12 | M | 13.8 | M | M | 2.6 | H | H | 0 | 0 | 44 | 51 |
| 13 | M | 15.4 | M | S | 2.8 | H | H | 0 | 0 | 29 | 42 |
| 14 | D | 15.9 | M | S | 1.4 | H | H | 0 | 0 | 79 | 39 |
| 15 | M | 12.0 | M | M | 1.9 | H | H | 0 | 0 | 31 | 28 |
| 16 | M | 15.0 | M | M | 2.3 | H | H | 0 | 0 | 48 | 73 |
| 17 | M | 14.8 | M | M | 2.5 | H | H | 0 | 0 | 186 | 81 |
| 18 | E | 14.6 | F | L | 2.3 | H | H | 0 | 0 | 54 | 24 |
| 19 | M[e] | 1.8 | F | M | 0.4 | H | H | 0 | 0 | 48 | 18 |
| 20 | M[e] | 1.8 | M | M | 0.4 | M | L-M | 0 | 0 | 6 | 4 |
| 21 | C[e] | 3.2 | F | L | 1.4 | M-H | M-H | 0 | 0 | 4 | 24 |
| 22 | M[e] | 3.6 | F | S | 1.1 | H | H | 0 | 0 | 90 | 29 |
| 23 | M | 13.0 | F | M | 3.4 | H | H | 0 | 0 | 27 | 26 |
| 24 | B | 10.0 | M | S | 1.8 | H | L-H | 0 | 0 | 87 | 19 |
| 25 | M | 9.5 | F | L | 2.7 | H | H | 0 | 0 | 53 | 45 |
| 26 | B | 12.3 | M | S | 2.2 | H | M-H | 0 | 0 | 38 | 17 |
| 27 | R | 15.9 | F | S | 1.9 | H | H | 0 | 0 | 26 | 47 |
| 28 | M | 16.1 | F | M | 1.1 | M-H | M | 0 | 0 | 7 | 12 |
| 29 | M | 11.6 | M | S | 1.6 | H | H | 0 | 0 | 118 | 38 |
| 30 | B | 10.4 | F | S | 1.3 | H | H | 0 | 0 | 61 | 39 | a. M = Mixed breed, B = Beagle, C = Collie, D = Dalmation, E = Elkhound, R = Red bone
b. S = Short, M = Medium, L = Long
c. L = Less than 10, M = 10 to 20, H = more than 21
d. No fleas could be found on the dogs
e. A designation given pups, 4-6 weeks old.

ages that can be made without departing from the spirit and scope of the present invention.

Referring to the drawing, the pest control package made in accordance with U.S. Pat. No. 2,818,167 and the present invention and generally designated by reference numeral 10 comprises a cylindrical tube-like receptacle 11 made from a plastic or like material that is compatible with the pest control composition. Pest control composition 12 made in accordance with the present invention is liquid when heated and may be poured into the cylindrical tube-like receptable and allowed to cool in solid stick form is positioned within and substantially fills the interior of the receptacle 11 in a loose press-fit relationship. Upon cooling the composition shrinks slightly, permitting the solid stick to slide easily out of the cylindrical tube-like receptacle. Also, in this connection, the composition has a somewhat waxy or innocuous character and thus lubricates the side walls of the cylindrical tube-like receptacle permitting the stick to slide easily. One end of the receptacle 11 is provided with a cylindrical operating disk 13, with the central area of such disk receiving one end of a threaded stem 14 which extends centrally into the solid stick composition. The stem 14 is provided with stop means which will prevent any axial movement with respect to the receptacle 11 and serves, upon rotation of the disk 13, to push the free end of the solid stick 12 beyond the upper free end of the receptacle 11 to provide a portion of the pest control composition for application to the neck or face of an animal. The stick composition 12 may be retracted back into the receptacle by operation of the disk 13. To provide a cover for the pest control package of the present invention, the free end of the receptacle 11 is provided with an exteriorly threaded end portion 15 and adapted to engage like elements of a cap 16. A receptacle of the type just described is disclosed in detail in U.S. Pat. No. 2,818,167 issued to Walter E. McKinley, and reference may be had to this patent for specific details of construction.

In the operation of the pest control package made in accordance with the present invention, cap 16 will be removed and the operating disk 13 rotated until the portion of the solid pest control stick 12 extends beyond the free end of the casing 11. The pest control composition is then rubbed around the neck of the animal or on the face of the animal, as the case may be. Upon completion of the application, the disk 13 is rotated in an opposite direction to permit the solid pest control stick to be retracted. The cover 16 is thereafter threadably engaged to the threaded portion of the casing.

The foregoing illustrations of the present invention are intended merely as exemplification of the present invention, and, as one skilled in the art will readily recognize, many variations and alterations can be made without violating the spirit and scope of the present invention as defined in the appended claims.

We claim:

1. A pest control package comprising a tubular receptacle, a pest control composition in solid stable tubular stick form which is liquid when heated and thereby may be poured into the tubular receptacle and allowed to cool in solid stick form which thereby is positioned within said receptacle, rotatable means positioned within said casing for propelling said pest composition into and out of said casing at one end thereof to provide a free end of said composition for dry rubbing engagement with the skin surface of an animal, actuating means associated at one end of said casing for operating said rotating means, and removable cap means associated with the other end of said casing, said pest control composition comprising from 98 to 99.75 percent by weight of a carrier in solid tubular stick form comprising by percent weight from 10–20 percent fatty acid, 5–15 percent fatty alcohol, 55–85 percent polyethylene glycol or mixtures thereof, and from 0.0–0.1 percent bitter tasting compound, and having from 0.25 to 2.0 percent by weight of 0-(2-isopropoxyphenyl)-N-methyl carbamate otherwise tending to be unstable in an alkaline medium, uniformly dispersed therewith as the active ingredient therefor, said composition being on the acid side and having a pH in the range of about 3.5 to not more than 7.0.

2. A pest control composition in accordance with claim 1, wherein said composition additionally contains not more than 0.1 percent by weight of a bitter tasting compound.

3. A pest control package in accordance with claim 1, wherein said receptacle is made of plastic.

4. A method of eliminating and controlling fleas on a domesticated animal comprising topically applying around the neck or on the face from the tubular stick receptacle of claim 1 in dry form to said animal about 0.1 to 0.3 grams per kilogram of body weight of a solid tubular acidic stick formulation in accordance with claim 1 having a pH of less than about 7.0 and containing 0.25 to 2.0 percent by weight of 0-(2-isopropoxyphenyl-N-methyl carbamate, said stick formulation having said carbamate uniformly dispersed therein at all times.

5. The method of claim 1, wherein about 0.13 to 0.25 grams per kilogram of body weight of said stick formulation are applied.

6. A method of eliminating and controlling fleas on a domesticated animal comprising topically applying in dry form around the neck and on the face of said animal from the tubular stick receptacle of claim 1 about 0.13 to 0.25 grams per kilogram of body weight of said animal of a solid tubular acidic stick formulation in accordance with claim 1 having a pH of about 4.9 comprising about 0.25 to 2.0 weight percent 0-(2-isopropoxyphenyl-N-methyl carbamate, otherwise tending to be unstable in an alkaline medium, about 10 to 20 weight percent triple pressed stearic acid, about 5 to 15 weight percent of a polyethylene glycol having a molecular weight of about 6,000, about 50 to 70 weight percent of a polyethylene glycol having a molecular weight of about 400, about 5 to 15 weight percent cetyl alcohol, and a minor, effective amount, less than about 0.1 weight percent, of benzyldiethyl(2,6-xylylcarbamoyl methyl) ammonium benzoate.

* * * * *